(12) United States Patent
Shimodaira

(10) Patent No.: US 10,537,995 B2
(45) Date of Patent: Jan. 21, 2020

(54) CONTROLLER AND CONTROL METHOD OF ROBOT, AND ROBOT SYSTEM

(71) Applicant: Seiko Epson Corporation, Tokyo (JP)

(72) Inventor: Yasuhiro Shimodaira, Matsumoto (JP)

(73) Assignee: Seiko Epson Corporation (JP)

( * ) Notice: Subject to any disclaimer, the term of this patent is extended or adjusted under 35 U.S.C. 154(b) by 213 days.

(21) Appl. No.: 15/701,913

(22) Filed: Sep. 12, 2017

(65) Prior Publication Data

US 2018/0319013 A1 Nov. 8, 2018

Related U.S. Application Data

(60) Provisional application No. 62/502,915, filed on May 8, 2017.

(51) Int. Cl.
*B25J 9/16* (2006.01)
*B25J 13/08* (2006.01)

(52) U.S. Cl.
CPC .............. *B25J 9/163* (2013.01); *B25J 9/1687* (2013.01); *B25J 13/085* (2013.01)

(58) Field of Classification Search
CPC ........ B25J 9/163; B25J 9/1633; B25J 9/1687; B25J 13/085
See application file for complete search history.

(56) References Cited

U.S. PATENT DOCUMENTS

| | | | |
|---|---|---|---|
| 9,138,893 B2 | 9/2015 | Nagai et al. | |
| 2014/0188281 A1* | 7/2014 | Nagai | G05B 19/425 700/264 |
| 2017/0008171 A1* | 1/2017 | Iwatake | B25J 9/1633 |
| 2017/0080562 A1* | 3/2017 | Tsuzaki | B25J 9/1633 |
| 2018/0029232 A1* | 2/2018 | Ouchi | B25J 9/1674 |
| 2018/0207798 A1* | 7/2018 | Tsuzaki | B25J 9/1633 |

FOREIGN PATENT DOCUMENTS

| | | |
|---|---|---|
| JP | 08-194521 A | 7/1996 |
| JP | 2014-166681 A | 9/2014 |
| JP | 2016-221646 A | 12/2016 |
| JP | 2017-010803 A | 1/2017 |

* cited by examiner

*Primary Examiner* — Robert T Nguyen
(74) *Attorney, Agent, or Firm* — Harness, Dickey & Pierce, P.L.C.

(57) ABSTRACT

When teaching a robot, at least one processor brings a first object and a second object into contact with each other with a first force by using the robot, and generates teaching data based on the contact. When causing the robot to perform an operation according to the teaching data, the at least one processor causes the first object and the second object to be fitted to each other with a second force greater than the first force, by using the robot.

15 Claims, 15 Drawing Sheets

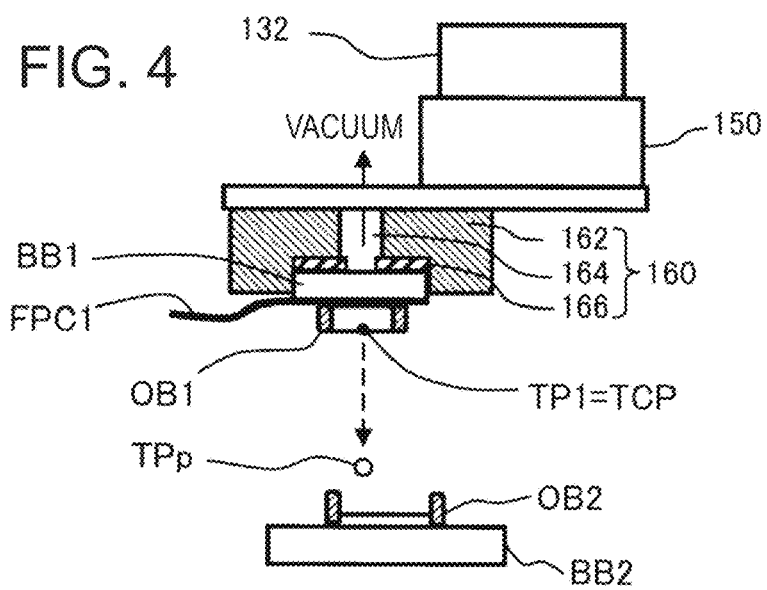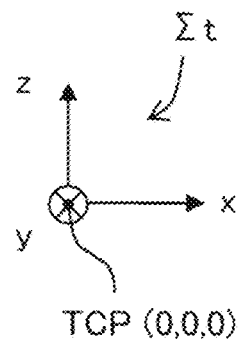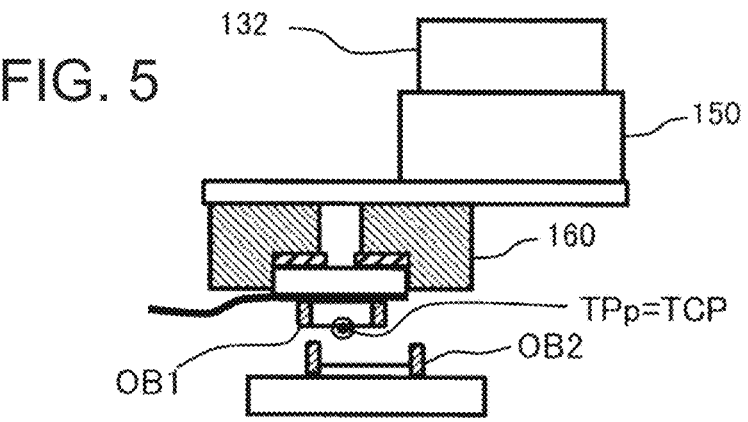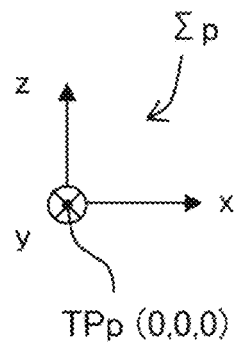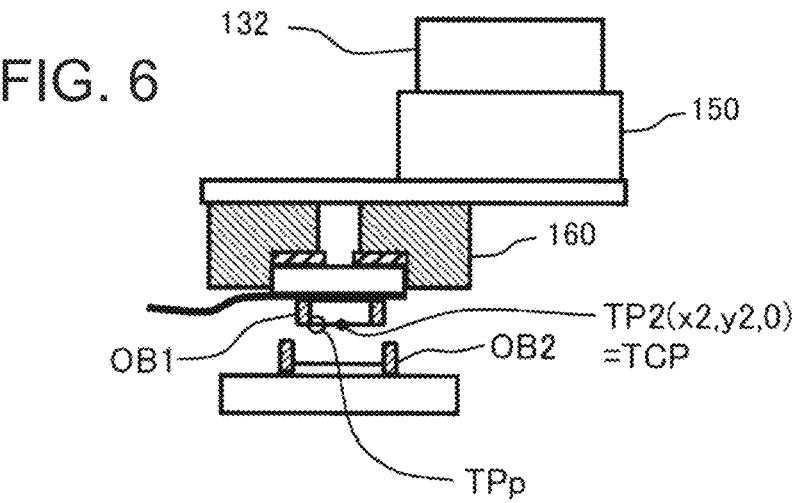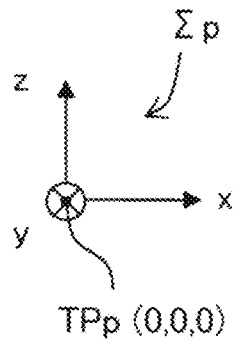

CONTROLLER AND CONTROL METHOD OF ROBOT, AND ROBOT SYSTEM

BACKGROUND

1. Technical Field

The present invention relates to a controller and a control method of a robot, and a robot system.

2. Related Art

JP-A-2014-166681 discloses a technique for teaching a robot a fitting work of two workpieces or objects. In the background art, the operation of the robot in the fitting work is divided into a contact operation, a search operation, and an insertion operation, and the operation condition parameters of the three operations are adjusted.

However, in the above-described background art, since a position suitable for insertion is searched while bringing two workpieces into contact with each other, there are cases where it is not possible to teach the robot an appropriate fitting work. Furthermore, there is a possibility that the workpiece holding position changes, and the workpiece is damaged, due to the elastic force of the workpiece itself, or the frictional force of the surface, by the search operation.

SUMMARY

An advantage of some aspects of the invention is to solve at least a part of the problems described above, and the invention can be implemented as the following aspects.

(1) According to a first aspect of the invention, there is provided a controller that performs a fitting work between a first object and a second object that can be fitted to the first object and controls a robot having a force detector. The controller includes at least one processor, and when teaching the robot, the at least one processor brings a first object and a second object into contact with each other with a first force by using the robot, and the at least one processor generates teaching data based on the contact. When causing the robot to perform a fitting operation according to the teaching data, the at least one processor causes the first object and the second object to be fitted to each other with a second force greater than the first force, by using the robot.

According to the controller, when teaching the robot, a first object and a second object are brought into contact with each other with a first force and teaching data is generated based on the contact, and when causing the robot to perform a fitting operation according to the teaching data, the first object and the second object are fitted to each other with a second force greater than the first force, such that it is not necessary to search for a position suitable for insertion while bringing the two objects into contact with each other, and it is possible to teach the robot an appropriate fitting work. In addition, since the search operation as in the related art is not performed, it is possible to reduce the possibility that the holding position of the object by the end effector is changed due to the elastic force of the object itself or the frictional force of the surface, and to reduce the possibility that the object is damaged, by the search operation.

(2) In the controller, the teaching data may be generated based on the contact on a plurality of relative positions of the first object and the second object.

According to the controller with this configuration, the relative position suitable for a fitting work can be determined from among the plurality of relative positions.

(3) In the controller, the at least one processor may perform the contact in a first direction in which the first object and the second object are brought close to each other from each relative position of the plurality of relative positions, and the plurality of relative positions may be positions in a two-dimensional direction that intersects the first direction.

According to the controller with this configuration, contact is performed for a plurality of relative positions which are positions in the two-dimensional direction intersecting the first direction, so that a relative position suitable for the fitting work can be determined. In addition, since the search operation as in the related art is not performed, it is possible to reduce the possibility that the holding position of the object by the end effector is changed due to the elastic force of the object itself or the frictional force of the surface, and to reduce the possibility that the object is damaged, by the search operation.

(4) In the controller, the plurality of relative positions may be set at a first interval in the two-dimensional direction.

According to the controller with this configuration, the plurality of relative positions can be easily set.

(5) In the controller, the plurality of relative positions may be set at a second interval narrower than the first interval in the two-dimensional direction, in a region including a relative position where the movement distance of the first object is the longest, when the first object and the second object are brought into contact with each other with the first force by moving the first object along the first direction from each relative position of the plurality of relative positions.

According to the controller with this configuration, the relative position suitable for the fitting work can be determined with high accuracy.

(6) In the controller, the at least one processor may perform the contact between the first object and the second object at a plurality of rotation angles around one or more axial directions.

According to the controller with this configuration, the relative position suitable for the fitting work can be determined with higher accuracy. In addition, since the search operation as in the related art is not performed with respect to the rotation angle, it is possible to reduce the possibility that the holding position of the object by the end effector is changed due to the elastic force of the object itself or the frictional force of the surface, and to reduce the possibility that the object is damaged, by the search operation.

(7) In the controller, the at least one processor may move the first object and the second object away after the contact at each relative position of the plurality of relative positions.

According to the controller with this configuration, it is possible to avoid the operation of moving the relative position while bringing the two objects into contact with each other, thereby reducing the possibility that the holding position of the object by the end effector is changed due to the elastic force of the object itself or the frictional force of the surface, and preventing the object is damaged, by the search operation as in the related art.

(8) In the controller, the at least one processor may select a relative position where the movement distance of the first object is the longest when the first object and the second object are brought into contact with each other with the first force by moving the first object along the first direction from each relative position of the plurality of relative positions, and set the selected relative position as a teaching point of the teaching data.

According to the controller with this configuration, since the relative position suitable for fitting is set as the teaching point, it is possible to successfully perform the fitting work of the first object and the second object according to the teaching data.

(9) In the controller, the first object and the second object are electrical connectors that are not fitted to each other with the first force but are fitted to each other with the second force. According to the controller, teaching suitable for the fitting work of the electrical connector and the fitting work can be performed.

(10) A second aspect of the invention is directed to a robot system including a robot and the controller connected to the robot.

In the robot system, it is not necessary to search for a position suitable for insertion while bringing the two objects into contact with each other, and it is possible to teach the robot an appropriate fitting work.

(11) According to a third aspect of the invention, there is provided a control method for controlling a robot having a force detector by at least one processor. In the control method, when teaching the robot, the at least one processor brings a first object and a second object into contact with each other with a first force by using the robot, and the at least one processor generates teaching data based on the contact. When causing the robot to perform an operation according to the teaching data, the at least one processor causes the first object and the second object to be fitted with each other with a second force greater than the first force, by using the robot.

According to the control method, when teaching the robot, the first object and the second object are brought into contact with each other with the first force and the teaching data is generated based on the contact, and when causing the robot to perform the operation according to the teaching data, the first object and the second object are fitted to each other with the second force greater than the first force, such that it is not necessary to search for a position suitable for insertion while bringing the two objects into contact with each other, and it is possible to successfully teach the robot a fitting work. In addition, since the search operation as in the related art is not performed, it is possible to reduce the possibility that the holding position of the object by the end effector is changed due to the elastic force of the object itself or the frictional force of the surface, and to reduce the possibility that the object is damaged, by the search operation.

The invention can be realized in various forms other than the above. For example, the invention can be realized in forms of a computer program for realizing the function of the controller, a non-transitory storage medium in which the computer program is recorded, or the like.

BRIEF DESCRIPTION OF THE DRAWINGS

The invention will be described with reference to the accompanying drawings, wherein like numbers reference like elements.

FIG. 4 is an explanatory diagram showing a positional relationship of objects at an evacuation point (first teaching point).

FIG. 5 is an explanatory diagram showing a positional relationship of objects at a preliminary teaching point.

FIG. 6 is an explanatory diagram showing a positional relationship of objects at a second teaching point.

DESCRIPTION OF EXEMPLARY EMBODIMENTS

First Embodiment

Figure 1:
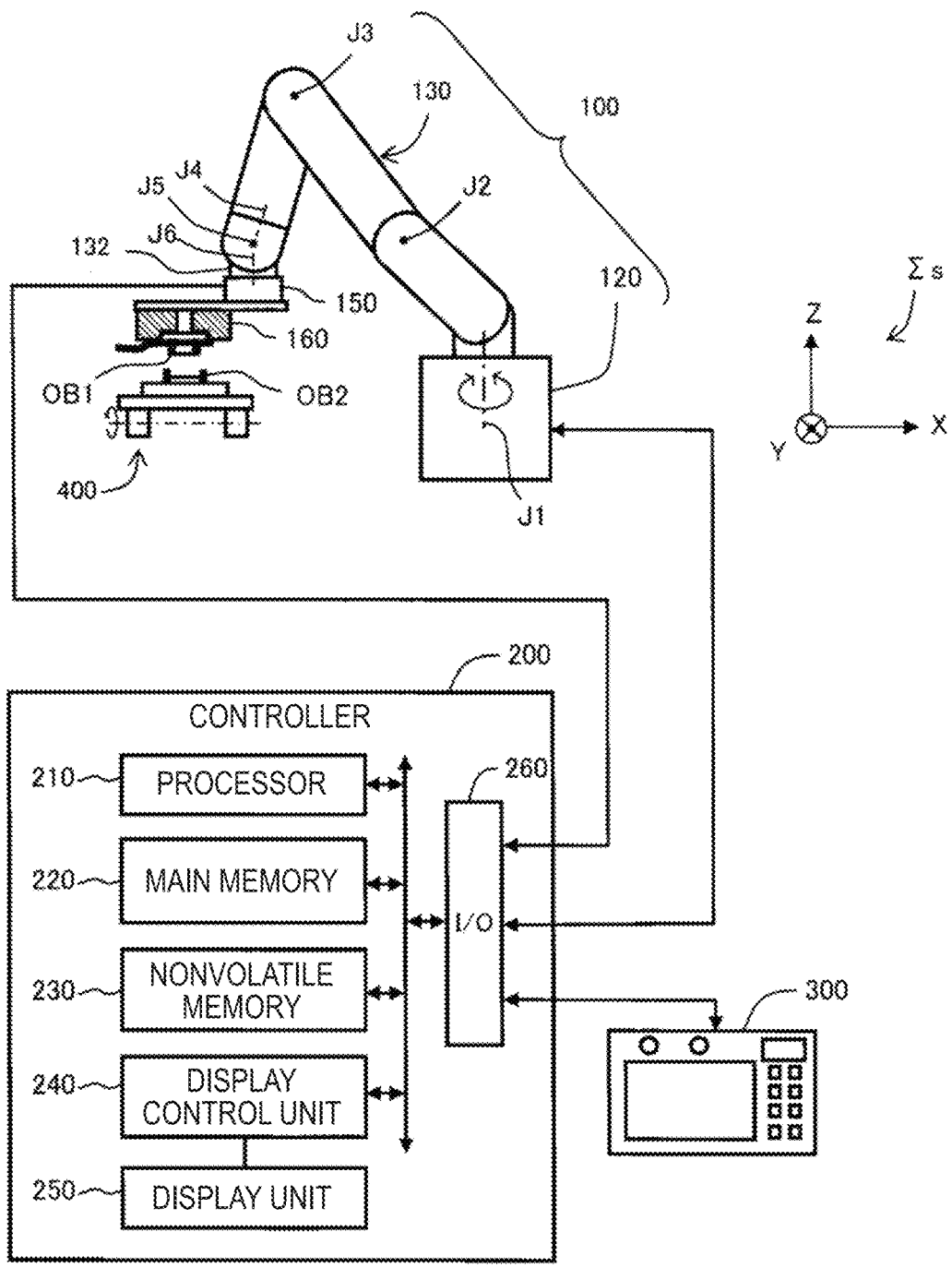
FIG. 1 is a conceptual diagram of a robot system.

FIG. 1 is a conceptual diagram of a robot system according to one embodiment. The robot system includes a robot 100, a controller 200, a teaching pendant 300, and a transporting apparatus 400. The robot 100 is a teaching playback type robot. A work using the robot 100 is executed according to teaching data which is generated in advance. In the robot system, a system coordinate system $\Sigma s$ defined by three orthogonal coordinate axes X, Y, and Z is set. In the example of FIG. 1, the X axis and the Y axis are in the horizontal direction, and the Z axis is in the vertical upward direction. The teaching points included in the teaching data and the posture of an end effector are expressed by the coordinate values of the system coordinate system $\Sigma s$ and the angle around each axis.

The robot 100 includes a base 120, and an arm 130. The arm 130 is connected to six joints J1 to J6 sequentially. Among these joints J1 to J6, the three joints J2, J3 and J5 are bending joints, and the other three joints J1, J4 and J6 are torsional joints. In the present embodiment, a 6-axis robot is illustrated, but it is possible to use a robot having a certain arm mechanism having one or more joints.

A force detector 150 and an end effector 160 are attached in this order to an arm end 132 which is the tip portion of the arm 130. In the example of FIG. 1, the end effector 160 is a mechanism that holds a first object OB1. Examples of the end effector 160 and the objects OB1 and OB2 will be described later.

The force detector 150 is a sensor that detects the force applied to the end effector 160. For the force detector 150, it is possible to use a load cell capable of detecting a force in a single axis direction, a force sensor or a torque sensor capable of detecting force components in a plurality of axial directions. In the present embodiment, a six-axis force sensor is used as the force detector 150. The six-axis force sensor detects the magnitude of the force parallel to the three detection axes orthogonal to each other in a unique sensor coordinate system, and the magnitude of the torque around the three detection axes. The force detector 150 may be provided at a position other than the position of the end effector 160, or may be provided at, for example, one or more joints among the joints J1 to J6.

The controller 200 includes a processor 210, a main memory 220, a nonvolatile memory 230, a display control unit 240, a display unit 250, and an I/O interface 260. These units are connected through a bus. The processor 210 is, for example, a microprocessor or a processor circuit. The controller 200 is connected to the force detector 150, the robot 100, and the teaching pendant 300 through the I/O interface 260.

As a configuration of controller 200, it is possible to adopt various configurations other than the configuration shown in FIG. 1. For example, the processor 210 and the main memory 220 may be deleted from the controller 200 in FIG. 1, and the processor 210 and the main memory 220 may be provided in another device communicably connected to the controller 200. In this case, the whole device including the other device and the controller 200 functions as a controller of the robot 100. In another embodiment, the controller 200 may have two or more processors 210. In yet another embodiment, the controller 200 may be implemented by a plurality of devices communicatively coupled to each other. In these various embodiments, the controller 200 is configured as a device or group of devices including one or more processors 210.

The teaching pendant 300 is a type of a robot teaching device used when a human teaching worker teaches the operation of the robot 100. The teaching pendant 300 includes a processor and a memory, not shown. The teaching data generated by teaching using the teaching pendant 300 is stored in the nonvolatile memory 230 of the controller 200.

Figure 2:
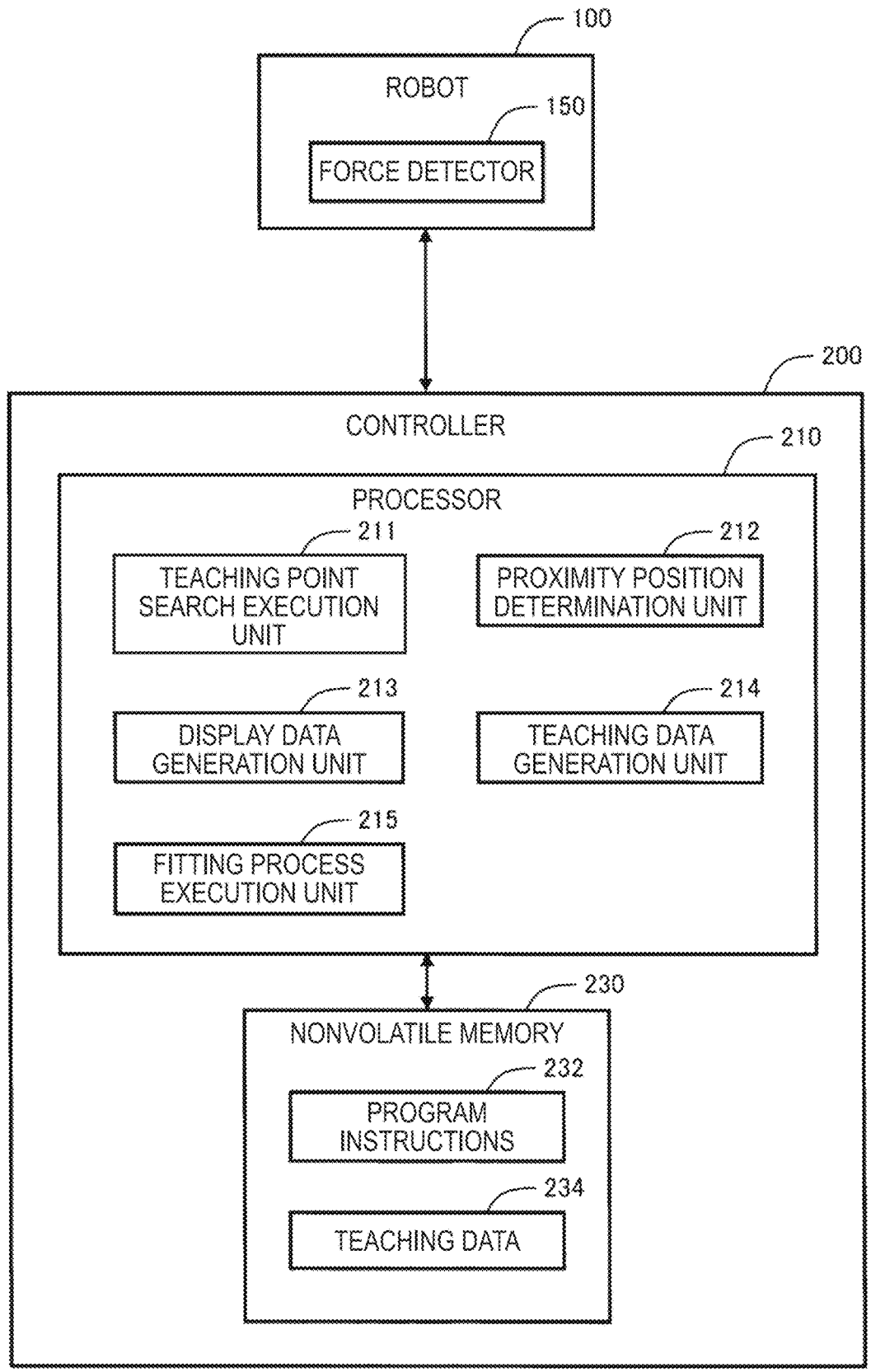
FIG. 2 is a block diagram illustrating functions of a robot and a controller.

FIG. 2 is a block diagram illustrating functions of the robot 100 and the controller 200. The processor 210 of the controller 200 executes various program instructions 232 previously stored in the nonvolatile memory 230 to implement the function of each of a teaching point search execution unit 211, a proximity position determination unit 212, a display data generation unit 213, a teaching data generation unit 214, and a fitting process execution unit 215. The functions of these units 211 to 215 will be described later. The nonvolatile memory 230 stores a teaching data 234 generated by the teaching data generation unit 214. The fitting process execution unit 215 controls the fitting work of the robot 100 according to the teaching data 234.

Figure 3:
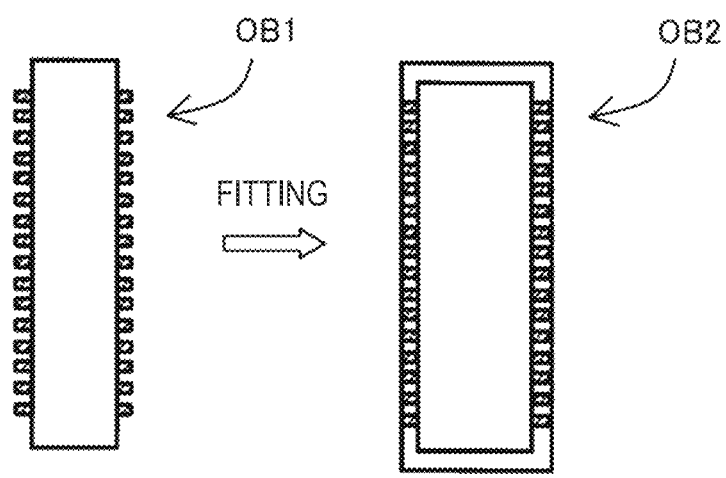
FIG. 3 is a plan view showing an example of an object.

FIG. 3 is a plan view showing an example of a first object OB1 and a second object OB2. The pair of objects OB1 and OB2 are electrical connectors, and when they fit, a plurality of electrical contacts provided in the two objects OB1 and OB2 are electrically connected to each other. In a teaching data generation work to be described later, teaching points suitable for the fitting work of the objects OB1 and OB2 are searched for, and teaching data is generated using the teaching points determined by the search. Objects other than the electrical connectors may be the objects OB1 and OB2. For example, two objects that are mechanically fitted to each other, without electrical contacts may be the objects OB1 and OB2.

FIGS. 4 to 6 are explanatory diagrams showing the positional relationship of the objects OB1 and OB2 at the time of searching for the teaching point. The end effector 160 has a mechanism that holds the first object OB1. The end effector 160 includes a vacuum suction plate 162 having a through hole 164, and a buffer material 166 made of rubber. The first object OB1 is fixed to a first substrate BB1 through a flexible printed circuit board FPC1. The first substrate BB1 is, for example, a reinforcing plate material made of plastic or metal. The vacuum suction plate 162 is provided with a recess into which the first substrate BB1 is disposed. The first substrate BB1 is subjected to vacuum suction by the through hole 164 of the end effector 160, and held in the recess of the vacuum suction plate 162. The buffer material 166 is disposed between the first substrate BB1 and the vacuum suction plate 162, and prevents damage to the first substrate BB1 due to direct contact between the first substrate BB1 and the vacuum suction plate 162. However, the buffer material 166 may be omitted. The second object OB2 is fixed on the second substrate BB2. The second substrate BB2 is, for example, a printed circuit board (PCB). The end effector 160 is not limited to holding the first object OB1 by vacuum suction, but other types of end effector such as a gripper may be used. In the example of FIG. 4, there is a gap between the inner peripheral surface of the recess of the vacuum suction plate 162 and the outer peripheral surface of the first substrate BB1. Therefore, if the search operation is performed while the first object OB1 and the second object OB2 are brought into contact with each other as in the related art, there is a possibility that the holding position of the first object OB1 is changed by the frictional force associated with the search operation. As described below, in the present embodiment, since the search operation as in the related art is not performed, it is possible to reduce the possibility that the holding position of the first object OB1 by the end effector is changed due to the elastic force of the object itself or the frictional force of the surface, and to reduce the possibility that the first object OB1 and the second object OB2 is damaged, by the search operation.

In the state shown in FIG. 4, a tool control point TCP of the robot 100 is positioned at a evacuation point TP1 above the second object OB2. The tool control point TCP is a position having a certain relative positional relationship with the end effector 160 of the robot 100, and is used as a work position of the end effector 160 in the control of the robot 100. In the present embodiment, the tool control point TCP is previously set at a point in the vicinity of the first object OB1 held by the end effector 160. The evacuation point TP1 is previously set at a position where the first object OB1 and the end effector 160 do not physically interfere with the second object OB2 and other peripheral objects. The setting of the evacuation point TP1 is performed, for example, by a human teaching worker operating the robot 100 visually until the state of FIG. 4 is reached, and designating the position at that time as a teaching point, using the teaching pendant 300. The evacuation point TP1 is also used as a first teaching point, in the teaching data on the fitting work of the two objects OB1 and OB2. This will be described later.

A tool coordinate system $\Sigma t$ which is a local coordinate system of the end effector 160 is drawn on the right side of FIG. 4. This tool coordinate system $\Sigma t$ is defined by three orthogonal coordinate axes x, y, and z, with the tool control point TCP as the coordinate origin. The +z direction is a direction in which the first object OB1 moves away from the second object OB2. The −z direction corresponds to a first direction in which the two objects OB1 and OB2 are brought close to each other. For the sake of convenience, the tool coordinate system $\Sigma t$ is drawn on the right side of the coordinate origin in FIG. 4.

The position of a preliminary teaching point TPp is shown slightly above the second object OB2. The preliminary teaching point TPp is a point advanced in the −z direction from the evacuation point TP1.

FIG. 5 shows the state where the end effector 160 descends from the state of FIG. 4, and the tool control point TCP reaches the preliminary teaching point TPp. The setting of the preliminary teaching point TPp is performed, for example, by a human teaching worker operating the robot 100 visually until the state of FIG. 5 is reached by using the teaching pendant 300, and designating the position at that time as a teaching point. At the time of a teaching point searching process to be described later, the robot 100 is controlled such that the tool control point TCP is moved substantially linearly from the evacuation point TP1 to the preliminary teaching point TPp as indicated by a broken line in FIG. 4.

A local coordinate system Σp of the end effector 160 at the preliminary teaching point TPp is drawn on the right side of FIG. 5. The local coordinate system Σp is defined by three orthogonal coordinate axes x, y, and z, with the preliminary teaching point TPp as the coordinate origin. In the teaching point searching process to be described later, the local coordinate system Σp is used.

The preliminary teaching point TPp shown in FIG. 5 is not a suitable position for the fitting work of the two objects OB1 and OB2. The reason for this is that human teaching workers have difficulties in visually setting a position suitable for fitting as the preliminary teaching point TPp because the objects OB1 and OB2 are smaller than the end effector 160. The teaching point searching process to be described later is a process of searching for a second teaching point suitable for fitting, using the preliminary teaching point TPp. In a case where the first object OB1 is hidden by the end effector 160 and the positional relationship between the two objects OB1 and OB2 cannot be visually checked as shown in FIG. 5, it is particularly effective to search for and set a teaching point suitable for fitting in the teaching point searching process to be described later.

FIG. 6 shows the state where the tool control point TCP has moved to a second teaching point TP2 set through the teaching point searching process. The coordinate value of the second teaching point TP2 in the local coordinate system Σp has a z coordinate value of 0, and an x coordinate value x2 and a y coordinate value y2 are set by searching. That is, the teaching point searching process is a process of searching for the x coordinate value x2 and the y coordinate value y2 of the second teaching point TP2, which is a position suitable for the search. The two-dimensional position (x2, y2) defined by the x coordinate value x2 and the y coordinate value y2 corresponds to the relative positions of the two objects OB1 and OB2. The position (x2, y2) corresponds to the position in the two-dimensional direction intersecting the −z direction (first direction). The preliminary teaching point TPp and the second teaching point TP2 are part of a plurality of relative positions of the first object OB1 and the second object OB2. The teaching point searching process is a process of searching for the second teaching point TP2 suitable for fitting, from among a plurality of relative positions.

Instead of teaching points such as the evacuation point TP1 (first teaching point), the preliminary teaching point TPp, and the second teaching point TP2, searching for the teaching pose suitable for fitting and generation of teaching data may be executed by using teaching pose at those positions.

Figure 7:
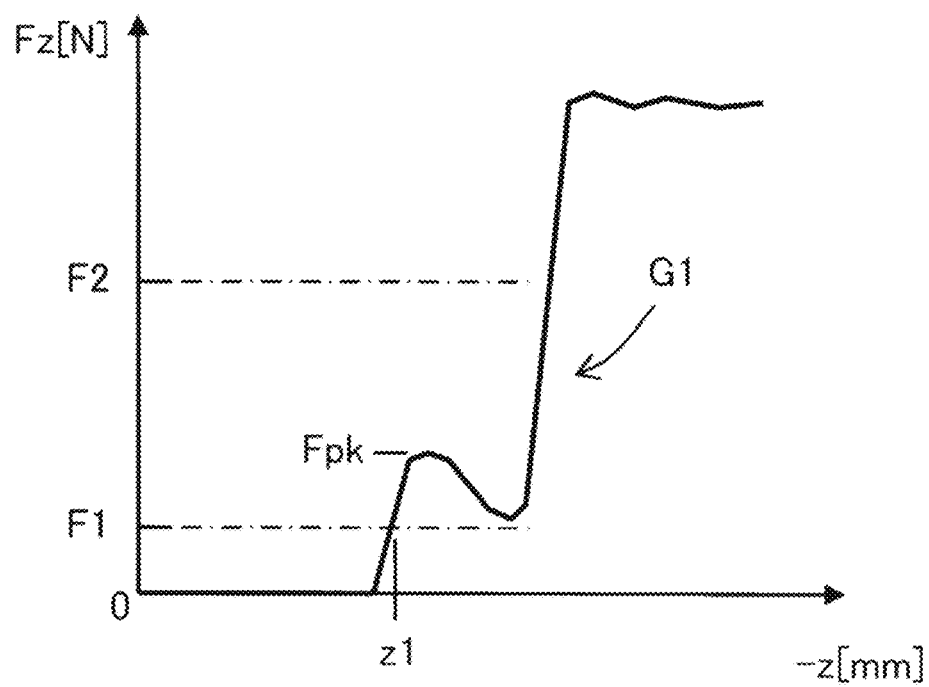
FIG. 7 is a graph showing a change in force when objects are close at an appropriate relative position.

FIG. 7 is a graph showing an example of a change in force when the two objects OB1 and OB2 are brought close to each other from the relative position (the second teaching point TP2 in FIG. 6) suitable for fitting. The horizontal axis is the −z coordinate value of the local coordinate system Σp (FIG. 6) with the preliminary teaching point TPp as the coordinate origin, and the vertical axis is a force Fz in the z direction detected by the force detector 150. The reason why the horizontal axis is set as the −z coordinate value is that the −z direction corresponds to the first direction in which the two objects OB1 and OB2 approach to each other.

In a graph G1, the force Fz is zero at the position where the z coordinate value is 0 (second teaching point TP2). When the first object OB1 advances in the −z direction and the two objects OB1 and OB2 are brought into contact, the force Fz increases as the first object OB1 moves in the −z direction, the force Fz temporarily decreases after reaching a peak value Fpk, and then the force Fz increases again. The objects OB1 and OB2 of the present embodiment are fitted to each other by pressing the objects OB1 and OB2 with a force exceeding the peak value Fpk. Once the objects OB1 and OB2 are fitted together, it is configured such that the fitted state cannot be released unless they are pulled apart with a strong force. The reason for this is to properly maintain the electrical connection between the objects OB1 and OB2 which are electrical connectors.

In the fitting work of fitting the objects OB1 and OB2 by using the robot 100, the two objects OB1 and OB2 are fitted to each other with a force F2 (second force) exceeding the peak value Fpk. On the other hand, in the process of searching for the relative position (second teaching point TP2) suitable for fitting the two objects OB1 and OB2 to each other, it is preferable that the two objects OB1 and OB2 are brought close to each other until they are brought into contact, with the force F1 (first force) smaller than the force F2 suitable for fitting. The reason for this is that if the objects OB1 and OB2 are brought close to each other from a relative position unsuitable for fitting and the force F2 is applied to them, there is a possibility that the holding position of the object OB1 is displaced and the search operation of an appropriate teach position is not known, and a possibility that a part (for example, an electrical contact, or the like) of the objects OB1 and OB2 is damaged. Since it is necessary to reduce the elements of variation, and it is necessary to avoid the situation change due to the external force in order to maintain the quality of the product, it is particularly preferable that the force F1 applied to the objects OB1 and OB2 at the time of search is smaller than the peak value Fpk of the graph G1. In this way, this is because even in a case where the two objects OB1 and OB2 are brought close to each other from a state where they are in appropriate relative positions, the two objects OB1 and OB2 are not fitted to each other, so a force necessary for separating them from the fitted state becomes unnecessary, and the searching process is performed more accurately in a shorter time. In a case where the two objects OB1 and OB2 are brought close to each other until the force reaches the force F1 from a state where they are in appropriate relative positions, the z coordinate value is z1. The force F1 is set to, for example, a value in the range of 0.3 N to 3 N.

Figure 8:
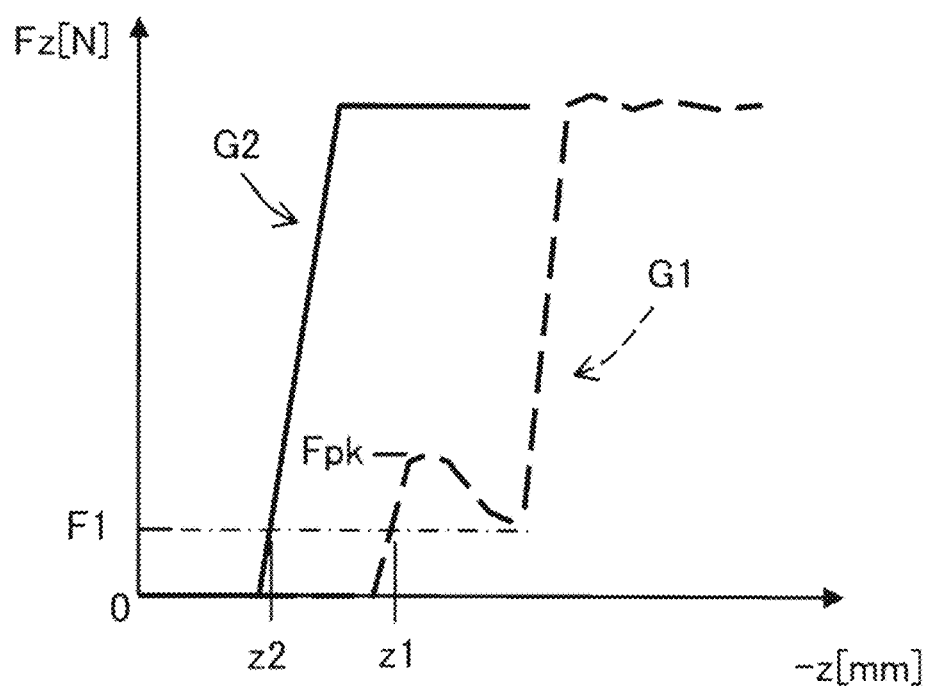
FIG. 8 is a graph showing a change in force when objects are close at an inappropriate relative position.

FIG. 8 is a graph showing an example of the change in force when the two objects OB1 and OB2 are brought close to each other from a relative position unsuitable for fitting. In the graph G2, after the object OB1 advances in the −z direction and the two objects OB1 and OB2 are brought into contact, the force Fz increases almost linearly. It means that the absolute value of the z coordinate value z2 when the force Fz reaches the first force F1 in the graph G2 is smaller than the absolute value of the z coordinate value z1 in the graph G1, and the movement distance of the first object OB1 is small. Therefore, it is possible to select a relative position suitable for fitting from among a plurality of relative positions, by bringing the two objects OB1 and OB2 into contact with each other at the plurality of relative positions with the force F1 and checking the z coordinate values z1 and z2 at that time, when searching for the appropriate relative position (second teaching point TP2).

Figure 9:
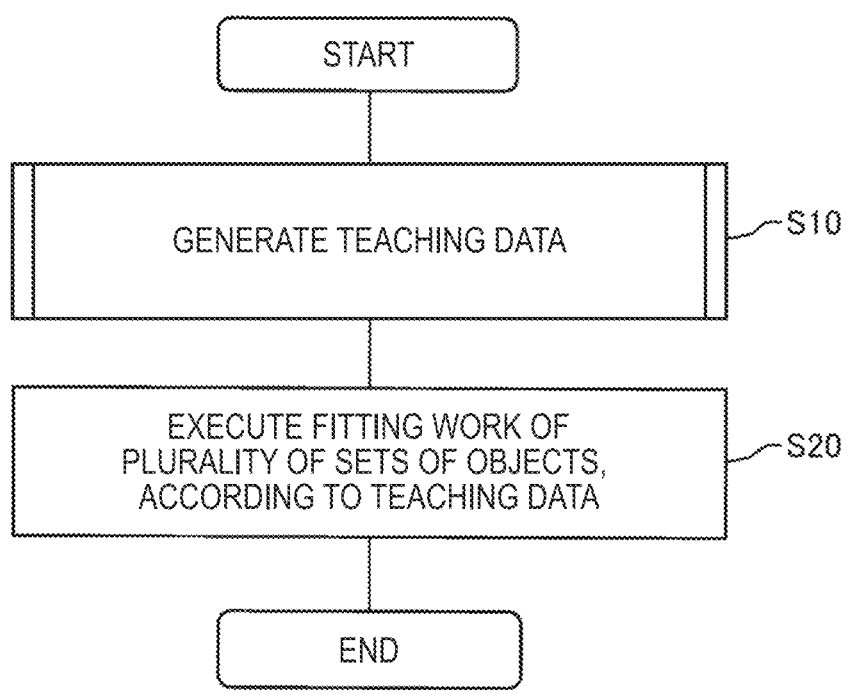
FIG. 9 is a flowchart showing an overall procedure of the teaching and the fitting work.

FIG. 9 is a flowchart showing an overall procedure of the teaching and the fitting work using the robot 100. In step S10, teaching data is generated. Details of this process will be described later. In step S20, the fitting work of each of a plurality of sets of objects OB1 and OB2 is executed according to teaching data. The fitting work is executed in the production line on which the robot system shown in FIG. 1 is provided. More specifically, when a plurality of second objects OB2 are sequentially transported one by one into the working space of the robot 100 by the transporting apparatus 400, the robot 100 executes a work of fitting the first object OB1 to the second object OB2 according to the teaching data. The first object OB1 may be transported together with the second object OB2 by the transporting apparatus 400, or may be transported into the working space of the robot 100 by a parts feeder (not shown). The fitting work in step S20 is executed under the control of the fitting process execution unit 215 (FIG. 2) of the controller 200.

Figure 10:
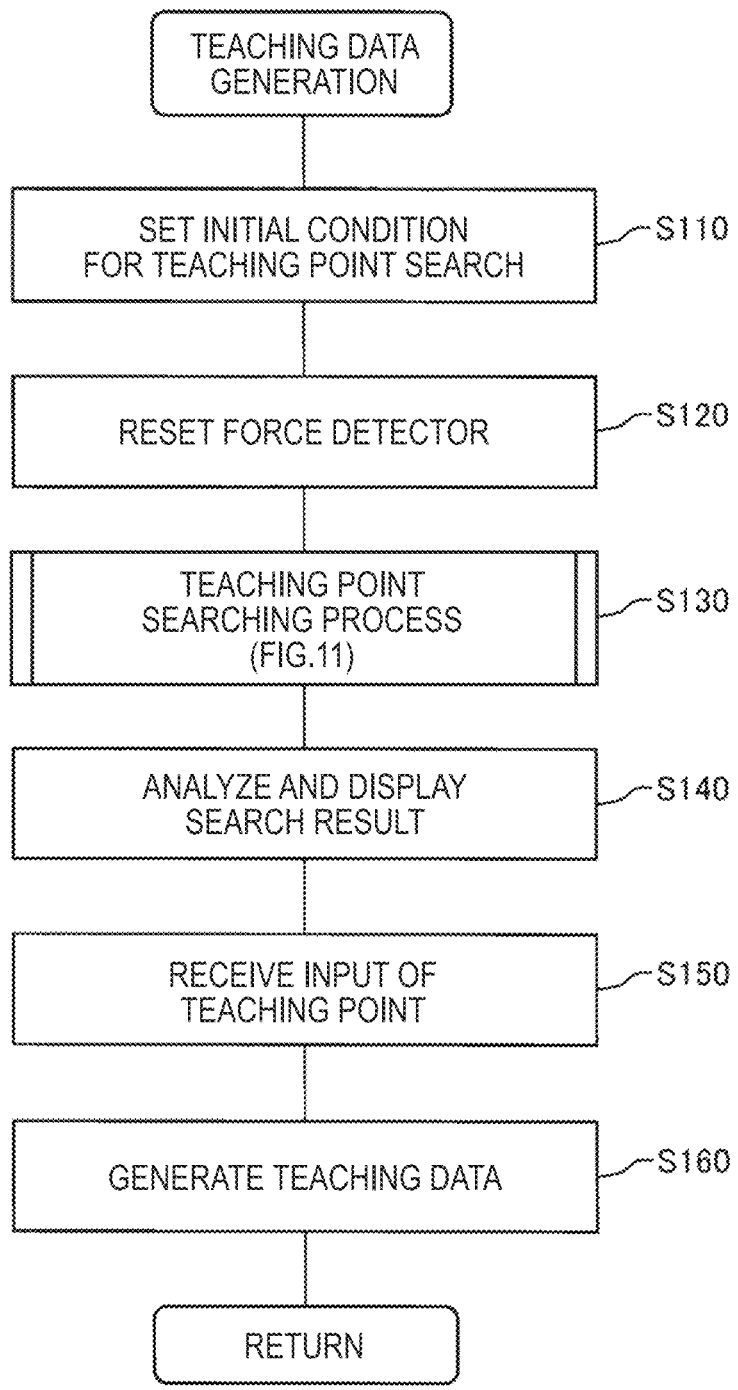
FIG. 10 is a flowchart showing a teaching data generation procedure in a first embodiment.

FIG. 10 is a flowchart showing a teaching data generation procedure in the first embodiment. In step S110, an initial condition for teaching point search is set. The initial condition includes the coordinate values of the evacuation point TP1 (FIG. 4) and the preliminary teaching point TPp (FIG. 5) in the system coordinate system Σs (FIG. 1), the unit movement amount of the relative positions of the objects OB1 and OB2, and the number of relative positions used for search. The unit movement amount of the relative position is a changing width when changing the two-dimensional coordinate value (x, y) of the local coordinate system τp from the preliminary teaching point TPp in FIG. 5. A plurality of relative positions of the objects OB1 and OB2 are three-dimensional positions (x, y, 0) where the z coordinate value of the local coordinate system Σp is 0 and the x coordinate value and the y coordinate value are set to various values. In the following description, the relative position is expressed as "relative position (x, y)" by using the two-dimensional coordinate value (x, y) of the three-dimensional position (x, y, 0) of the local coordinate system Σp.

In step S120, the controller 200 resets the force detector 150. This reset is a process for eliminating undesirable output shift of the force detector 150. In addition, this reset means a process of setting the output value (force detection value) of the force detector 150 to a predetermined value (reference value). In other words, the reset of the force detector 150 means, for example, a process of eliminating or reducing the influence of gravity due to the weight variation of an object held by the end effector 160 or the pose of the arm 130, the influence of the drift due to the leakage current of a circuit, or thermal expansion, or the like. That is, the process of setting the value output from the force detector 150 to a predetermined value (reference value) under the condition having these influences is reset. The predetermined value is preferably "0".

In step S130, a teaching point searching process is executed. This process is executed under the control of the teaching point search execution unit 211 (FIG. 2) of the controller 200.

Figure 11:
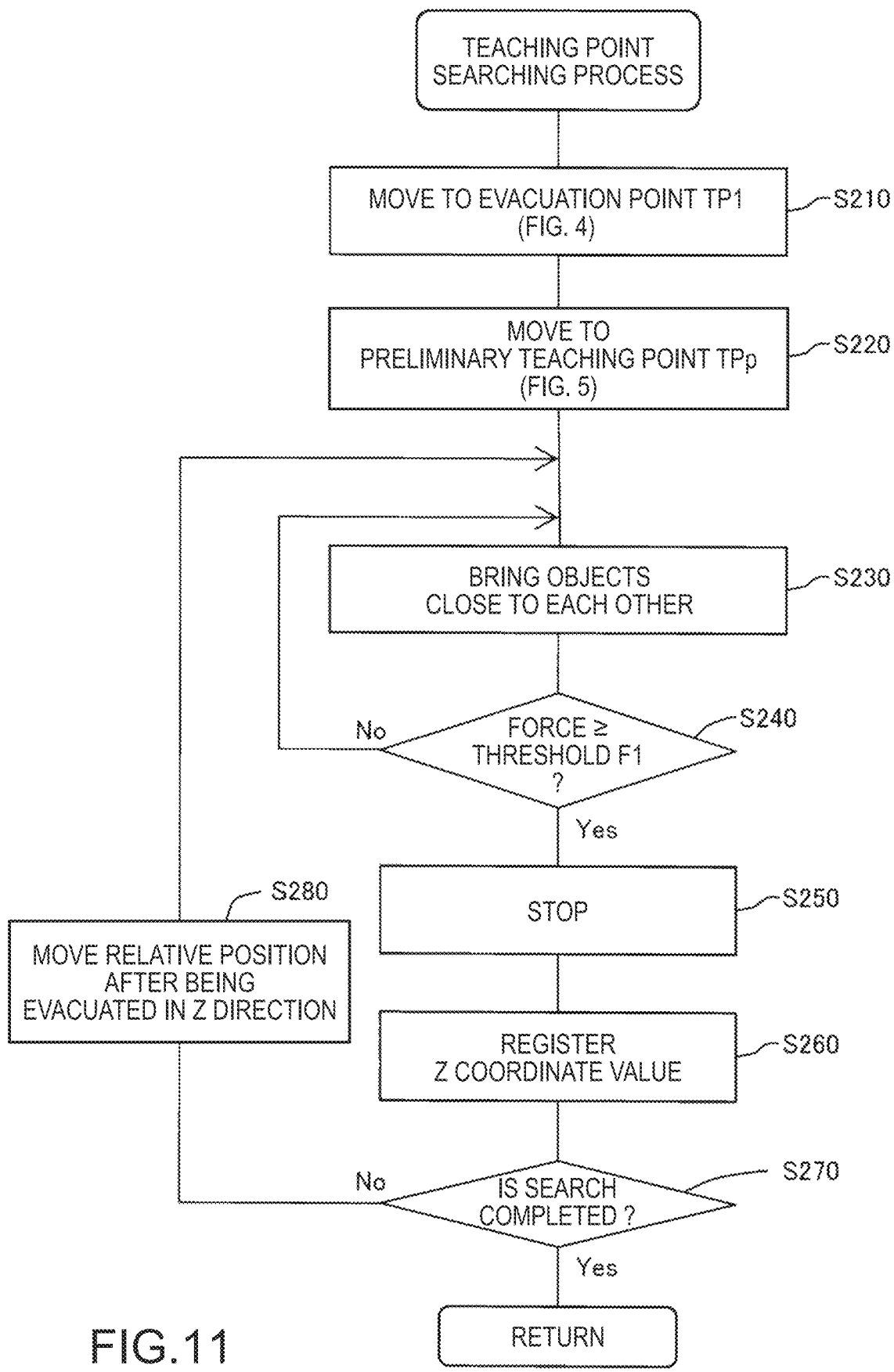
FIG. 11 is a flowchart showing a detailed procedure of a teaching point searching process.

FIG. 11 is a flowchart showing a detailed procedure of the teaching point searching process. In step S210, the tool control point TCP is moved to the first teaching point TP1 (FIG. 4) before the start of the search operation. In step S220, the tool control point TCP is moved to the preliminary teaching point TPp (FIG. 5). This operation is an operation of advancing the tool control point TCP to the position of the preliminary teaching point TPp in the −z direction as shown in FIG. 4. The movement operation in steps S210 and S220 is executed by position control with the teaching points TP1 and TPp as target positions, without using the force detection value of the force detector 150.

In steps S230 and S240, the objects OB1 and OB2 are brought close to each other until they are brought into contact with each other with the force threshold F1. The force threshold F1 is the same as the first force F1 described with reference to FIGS. 7 and 8. The processes in steps S230 and S240 are performed while executing force control of the robot 100. In the present specification, "force control" refers to control of moving the end effector 160 using the feedback of the force detection value obtained by the force detector 150. For the force control, for example, impedance control can be used. When the force Fz in the z direction detected by the force detector 150 reaches the force threshold F1, the process proceeds to step S250, and the operation of the robot 100 is stopped. In step S260, the z coordinate value of the local coordinate system Σp at the stop position is registered in the memory (for example, the nonvolatile memory 230).

In step S270, it is determined whether the search is completed or not. This determination is made, for example, by determining whether or not the number of searched relative positions reaches the number of relative positions set in step S110 of FIG. 10. If the search is not completed, in step S280, the end effector 160 is evacuated in the z direction, the relative position (x, y) is moved, and the process returns to step S230. Here, two objects OB1 and OB2 are kept away from each other before moving the relative position (x, y) after the contact of the objects OB1 and OB2 at each relative position (x, y). In this way, since it is possible to avoid the operation of moving the relative positions (x, y) while bringing the two objects OB1 and OB2 into contact with each other, it is possible to prevent the holding position of the object OB1 from being displaced, and it is possible to prevent damage to the objects OB1 and OB2. The evacuation in step S280 is performed, for example, by moving the end effector 160 in the +z direction until the z coordinate value becomes 0.

Figure 12:
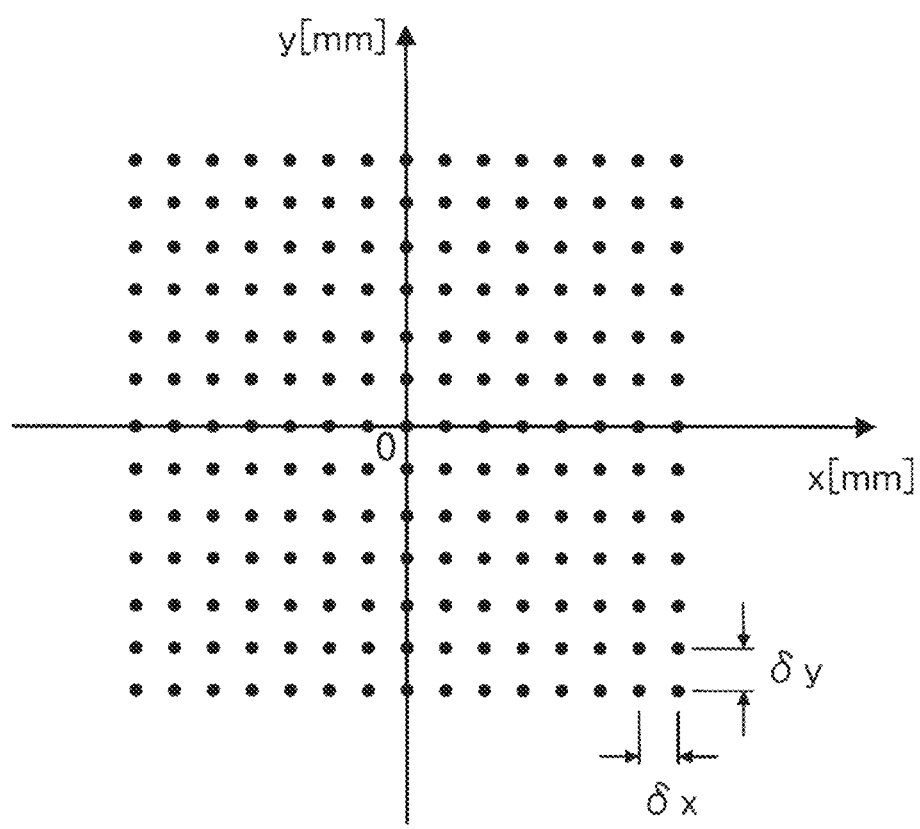
FIG. 12 is an explanatory diagram showing an example of a plurality of relative positions.

FIG. 12 is an explanatory diagram showing an example of a plurality of relative positions (x, y). The x and y axes show the x and y axes of the local coordinate system Σp shown in FIG. 5. The coordinate origin is the position (0, 0) of the preliminary teaching point TPp in the local coordinate system Σp. A plurality of black dots indicates the relative positions (x, y) set as search targets. The intervals δx and δy of the adjacent relative position (x, y) correspond to the unit movement amount of the relative position. The unit movement amounts δx and δy can be set to, for example, a value in the range of 0.1 mm to 0.2 mm. In the example of FIG. 12, a plurality of relative positions (x, y) is set at a first interval in the two-dimensional direction. In this way, it is possible to easily set a plurality of relative positions (x, y). Further, it is preferable that the first interval is made equal.

If it is determined in step S270 in FIG. 11 that the search is ended, the process proceeds to step S140 in FIG. 10. In step S140, the search result is analyzed, and the analysis result is displayed. In the analysis of the search results, first, with respect to a plurality of relative positions (x, y) shown in FIG. 12, the z coordinate values registered in step S260 of FIG. 11 are sequentially scanned, and the maximum value of the absolute value of the z coordinate value is detected. The relative position (x, y) corresponding to the detected z coordinate value is recognized as the relative position where the movement distance of the first object OB1 is the longest when the objects OB1 and OB2 are brought into contact with each other with the force F1 by moving the first object OB1 from each relative position along the −z direction (first direction). The analysis in step S140 is executed by the proximity position determination unit 212 (FIG. 2) of the controller 200. The display data for displaying the analysis result is generated by the display data generation unit 213 (FIG. 2) of the controller 200 and displayed on the display unit 250 of the controller 200.

Figure 13:
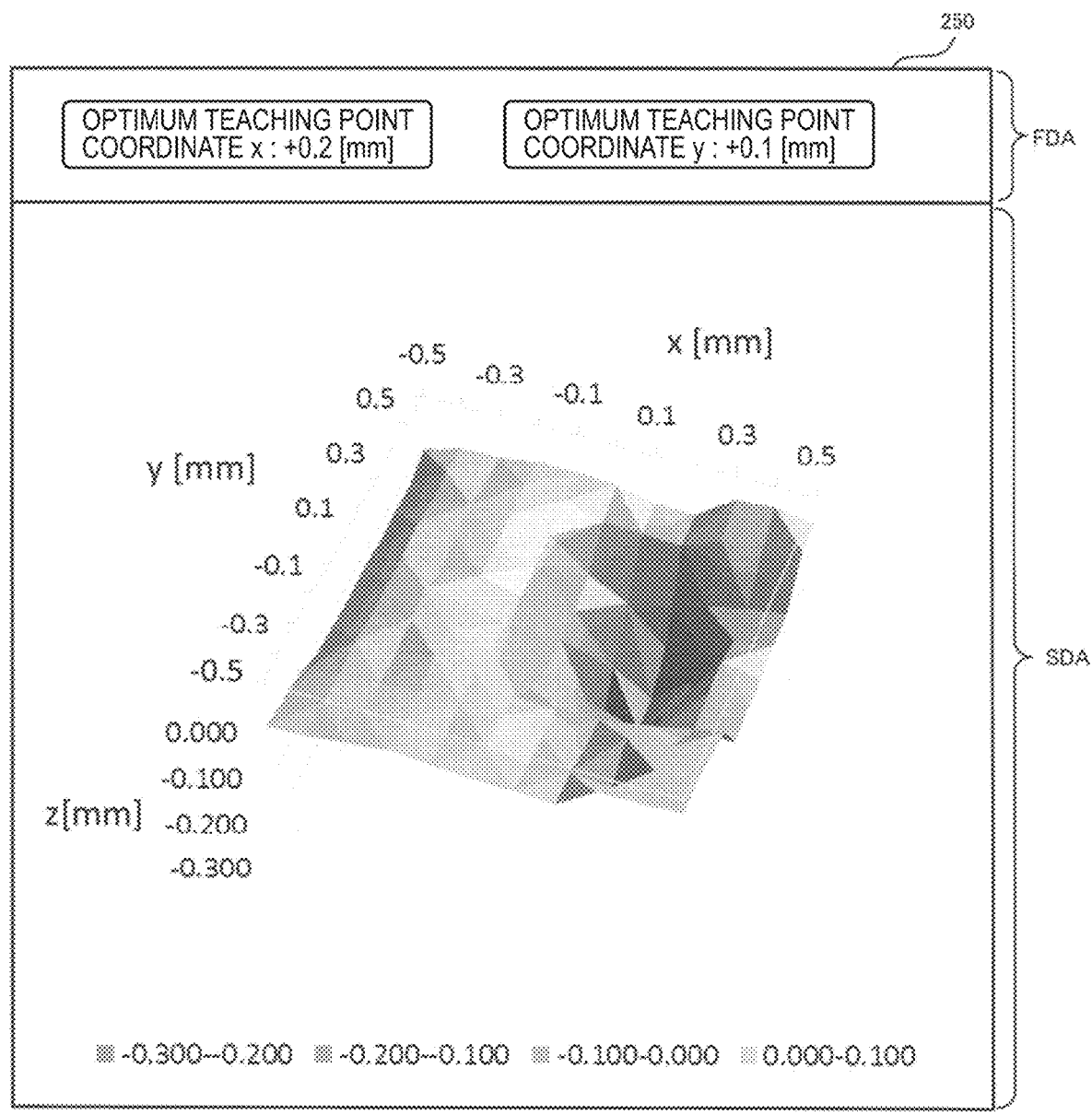
FIG. 13 is an explanatory diagram showing an example of an analysis result of the teaching point searching process.

FIG. 13 shows an example of the analysis result of the teaching point searching process displayed on the display unit 250 of the controller 200. The display screen of the analysis result includes a first display area FDA and a second display area SDA. In the first display area FDA, the coordinate value of the relative position (x, y) at which the absolute value of the z coordinate value shows the maximum value is displayed as the coordinate value indicating the optimum teaching point. In the second display area SDA, the distribution of the z coordinate values at a plurality of relative positions (x, y) is stereoscopically displayed. In this example, the absolute value of the z coordinate value is the maximum value at the position of x=+0.2 mm, and y=+0.1 mm. Thus, if the relative position (x, y) suitable for fitting and the z coordinate values at a plurality of relative positions (x, y) are displayed on the display unit 250, a human teaching worker can easily set appropriate teaching points using the teaching pendant 300. The coordinate value of the optimum teaching point may be displayed in the coordinates of another coordinate system such as the system coordinate system Σs (FIG. 1) instead of the local coordinate system Σp (FIG. 5).

In step S150 of FIG. 10, the teaching worker inputs the relative position (x, y) suitable for fitting as the x coordinate value and y coordinate value of the second teaching point TP2 using the teaching pendant 300, and the controller 200 receives the input of the teaching point. The coordinate value of the second teaching point TP2 may be input as the coordinate value of the local coordinate system Σp (FIG. 5) or as the coordinate value of another coordinate system such as the system coordinate system Σs (FIG. 1). In step S160, the teaching data 234 is generated using the input of the received teaching point, and stored in the nonvolatile memory 230 of the controller 200. The generation of the teaching data 234 is executed by the teaching data generation unit 214 of the controller 200. As is well known, the teaching data 234 includes a plurality of teaching points, and a description of control modes (position control and force control) to be executed upon movement between respective teaching points. This control mode is also designated by the teaching worker using the teaching pendant 300. When the teaching data 234 is completed in this manner, in step S20 of FIG. 9, in order to manufacture the actual product, the fitting work according to the teaching data is executed for a plurality of sets of objects OB1 and OB2.

Figure 14:
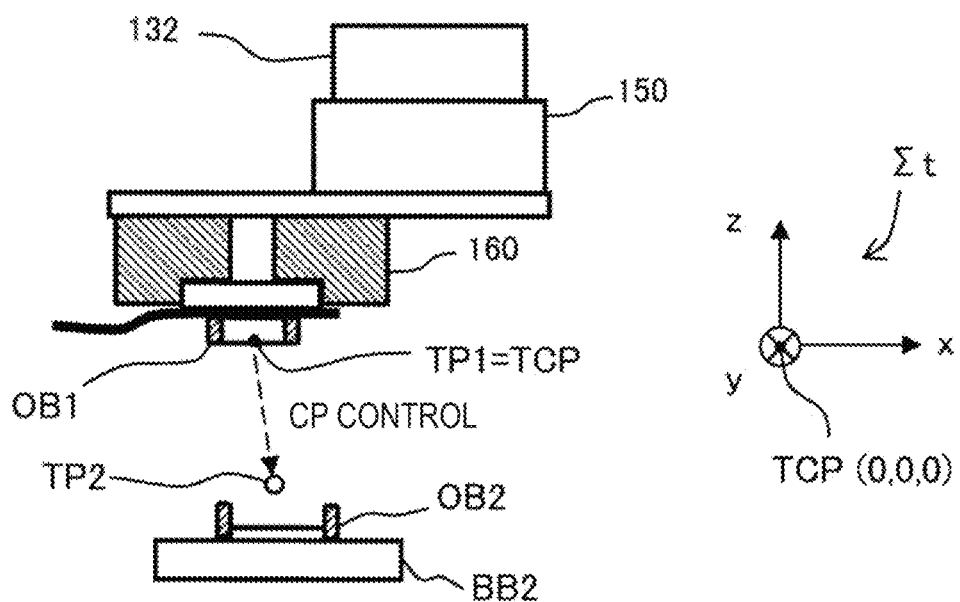
FIG. 14 is an explanatory diagram showing an example of a movement operation from the first teaching point to the second teaching point.

FIG. 14 is an explanatory diagram showing an example of the movement of the end effector 160 from the first teaching point TP1 to the second teaching point TP2 according to teaching data. This movement operation is the operation in the fitting work in step S20 of FIG. 9. Position control in the movement from the first teaching point TP1 to the second teaching point TP2 is performed by, for example, Continuous Path control (CP control). The CP control is a control method in which two points are continuously interpolated so that the movement path between two points of the end effector 160 follows a certain trajectory. In the example of FIG. 14, the movement path between the first teaching point TP1 and the second teaching point TP2 is formed so as to follow a linear trajectory. In this way, it is possible to reduce the possibility that the first object OB1 and the end effector 160 physically interfere with other objects. After reaching the second teaching point TP2, the end effector 160 is moved in the −z direction, and the end effector 160 is moved until the force detected by the force detector 150 reaches the second force F2 (FIG. 7) so as to fit the objects OB1 and OB2 with each other. Thereafter, the end effector 160 is evacuated in the +z direction, and a work such as fitting of other objects is executed as necessary. In addition, the operation of fitting the two objects OB1 and OB2 in step S20 may be performed using only position control such as CP control, or may be executed using position control and force control.

As described above, in the first embodiment, when teaching the robot 100, the processor 210 brings the first object OB1 and the second object OB2 into contact with each other with the first force F1 by using the robot 100, and generates teaching data based on the contact. When causing the robot 100 to perform a fitting operation according to the teaching data, the processor 210 fits the first object OB1 and the second object OB2 to each other with the second force F2 greater than the first force F1, by using the robot 100. Therefore, it is not necessary to search for a position suitable for insertion while bringing the two objects OB1 and OB2 into contact with each other, and it is possible to teach the robot 100 an appropriate fitting operation.

Second Embodiment

Figure 15:
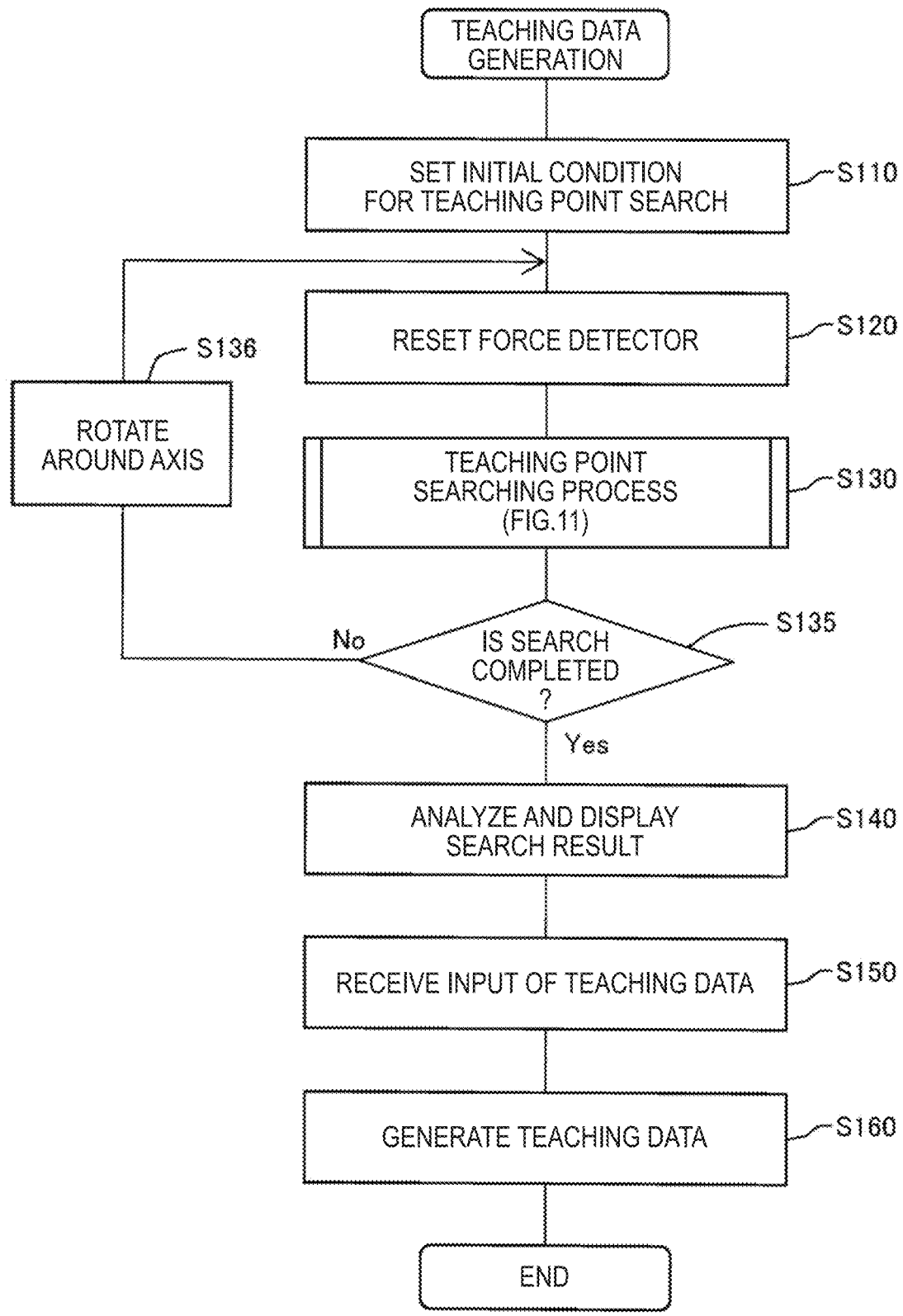
FIG. 15 is a flowchart showing a teaching data generation procedure in a second embodiment.
Figure 16:
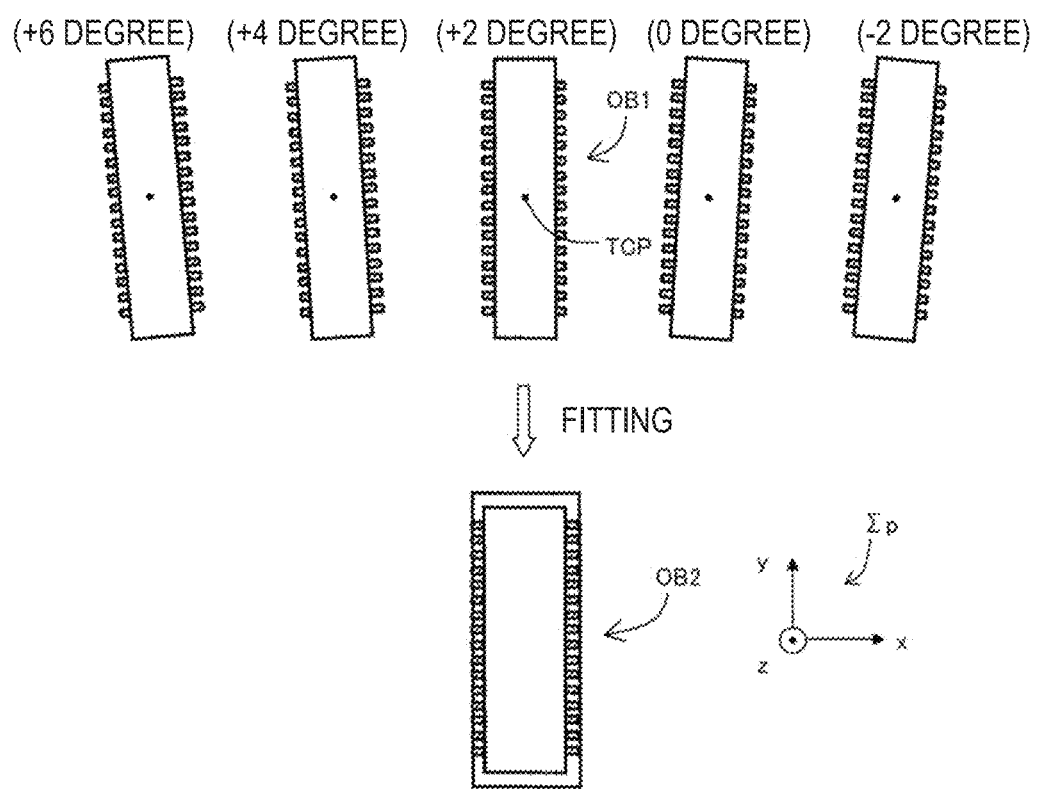
FIG. 16 is an explanatory diagram showing a rotation angle of an object in the second embodiment.

FIG. 15 is a flowchart showing a teaching data generation procedure in the second embodiment, corresponding to the first embodiment FIG. 10. FIG. 16 is an explanatory diagram illustrating the state of rotation of the object in the second embodiment. Since the configuration of the robot system is the same as that of the first embodiment, the description thereof will be omitted. The second embodiment is different from the first embodiment in that steps S135 and S136 are added, and the other procedures are the same as in the first embodiment.

When the teaching point searching process (FIG. 11) is completed in step S130, the process proceeds to step S135, and it is determined whether or not all the searches have been completed. In the second embodiment, the teaching point searching process is executed at a plurality of rotation angles around one or more axial directions. For example, the teaching point searching process in step S130 is executed at a plurality of rotation angles, with respect to rotation of one or more among rolling, pitching, and yawing. Here, the rolling means rotation around the x-axis direction of the local coordinate system Σp, the pitching means rotation around the y-axis direction, and yawing means rotation around the z-axis direction. FIG. 16 shows an example in which the first object OB1 is rotated in the range of +6 degrees to −2 degrees around the z-axis direction of the local coordinate system Σp. A more appropriate teaching point position can be determined by executing the teaching point searching process at these plural rotation angles. In addition, it is preferable to execute the teaching point searching process in step S130 at a plurality of rotation angles, with respect to all three types of rotations of rolling, pitching, and yawing. The setting of the rotation angle is changed in step S136, and then steps S120 and S130 are executed again.

The second embodiment also has substantially the same effect as the first embodiment described above. In the second embodiment, since the teaching point searching process is executed at a plurality of rotation angles around at least one axial direction, the relative position suitable for the fitting work can be determined with higher accuracy.

Third Embodiment

Figure 17:
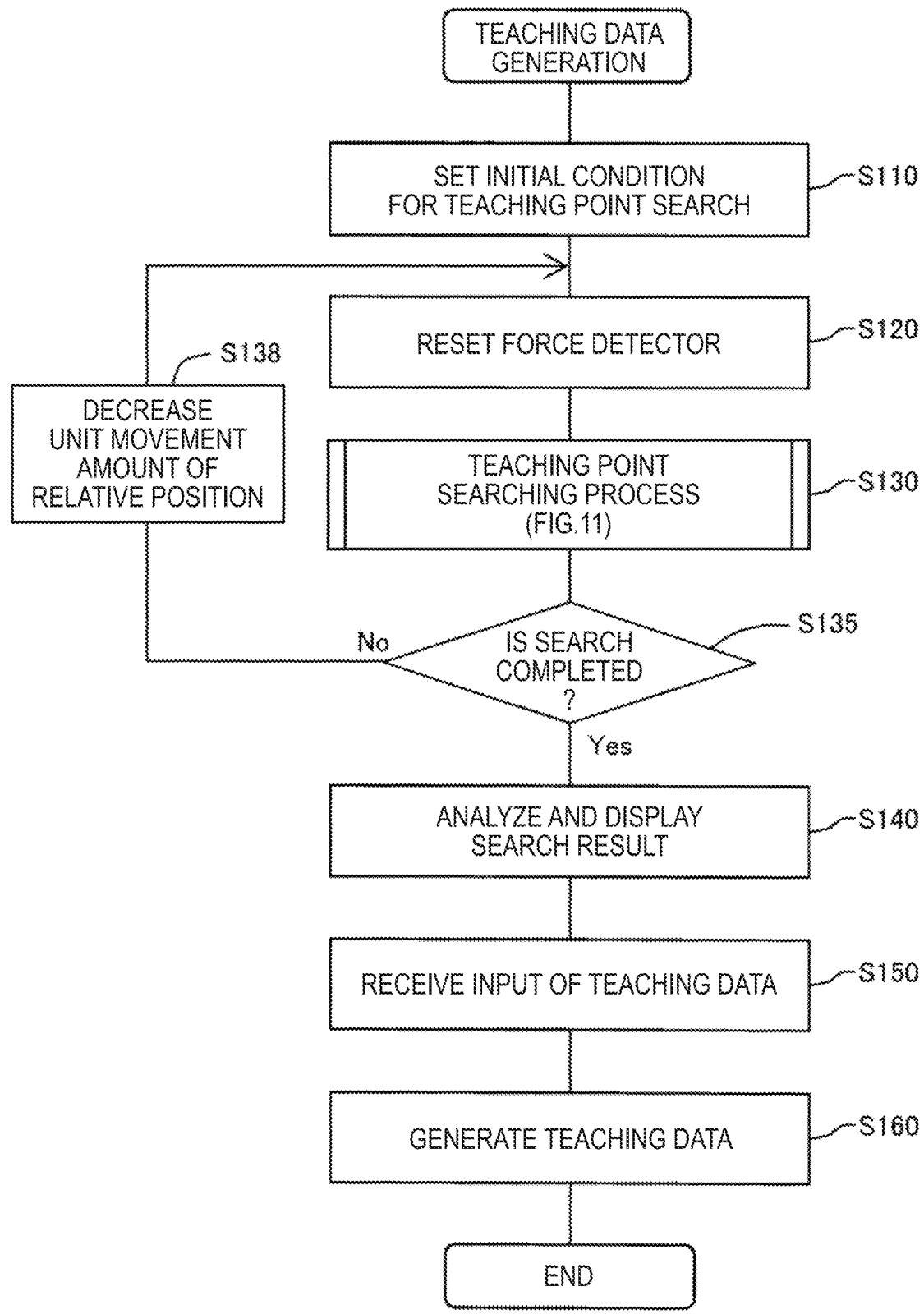
FIG. 17 is a flowchart showing a teaching data generation procedure in a third embodiment.

FIG. 17 is a flowchart showing a teaching data generation procedure in the third embodiment, corresponding to the second embodiment FIG. 15. Since the configuration of the robot system is the same as those of the first embodiment and second embodiment, the description thereof will be omitted. The third embodiment is different from the second embodiment only in that step S136 is replaced with step S138, and the other procedures are the same as those of the second embodiment.

When the teaching point searching process (FIG. 11) is completed in step S130, the process proceeds to step S135, and it is determined whether or not all the searches have been completed. In the third embodiment, when the relative position at which the movement distance of the first object OB1 until first contact is the longest is obtained by the first execution of step S130, the process proceeds from step S135 to step S138, and the unit movement amounts δx and δy (FIG. 12) for search are decreased. After that, steps S120 and S130 are executed again.

Figure 18:
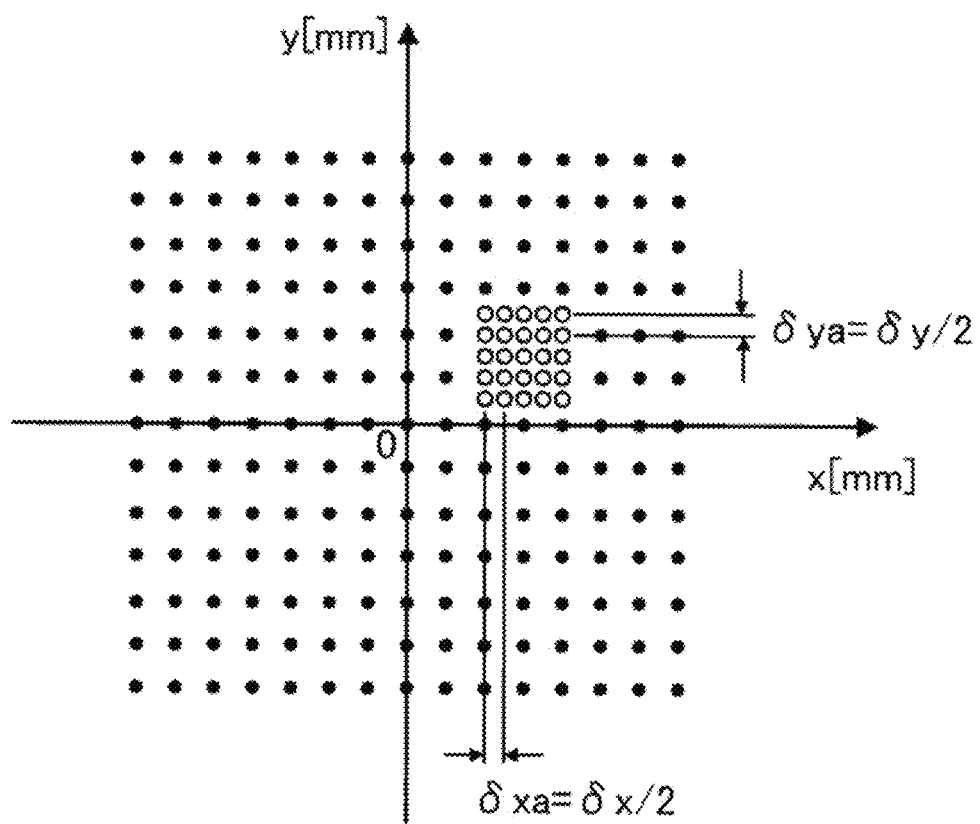
FIG. 18 is an explanatory diagram showing an example of a plurality of relative positions searched in the third embodiment.

FIG. 18 is an explanatory diagram showing an example of a plurality of relative positions searched in the third embodiment. Black circles indicate points used as relative positions (x, y) at the first execution of step S130, and white circles indicate points used as relative positions (x, y) at the second execution of step S130. However, at the positions where the white circles and the black circles overlap, only the white circles are drawn. The unit movement amounts δxa and δya of the search at the time of second search are smaller than the unit movement amounts δx and δy (FIG. 12) at the first time. In this example, δxa=δx/2, and δya=δy/2. In addition, the range of the relative position at the time of the second search is narrower than the range of the relative position at the time of the first search. The reason for this is that since the relative position suitable for fitting is almost determined by the first search, only the surroundings thereof need to be re-searched at the time of the second search. In this way, at the time of the second search, it is preferable to perform the search under the condition that the intervals δxa and δya in the two-dimensional direction are made narrow in the region (that is, a small region including the relative position) in the vicinity of the relative position where the movement distance of the first object OB1 at the time of contact of the two objects OB1 and OB2 at the time of the first search is the longest. In addition, such searching may be executed three times or more. In either case, it is preferable that the interval (second interval) in the two-dimensional direction between the relative positions is set to the narrowest in the vicinity of the relative position where the movement distance of the first object OB1 is the longest when the first object OB1 and the second object OB2 are brought into contact with each other with the first force F1 by moving the first object OB1 in the −z direction (first direction).

The third embodiment also has substantially the same effect as the first embodiment described above. In the third embodiment, since the interval in the two-dimensional direction between the relative positions is set to the narrowest in the vicinity of the relative position where the movement distance of the first object OB1 is the longest when the first object OB1 and the second object OB2 are brought into contact with each other with the first force F1 by moving the first object OB1 in the −z direction (first direction) from the relative positions, the relative position suitable for the fitting work can be determined with higher accuracy.

The invention is not limited to the above-described embodiments, examples, and modification examples, and can be realized in various configurations without departing from the spirit thereof. For example, the technical features of the embodiments, examples, and modification examples corresponding to the technical features of each aspect described in the summary of invention section can be replaced or combined as appropriate, in order to solve some or all of the above-mentioned problems, or in order to achieve some or all of the aforementioned effects. Unless its technical features are described as essential herein, they can be deleted as appropriate.

This application claims priority to U.S. Provisional Patent Application No. 62/502,915 filed May 8, 2017 which is hereby expressly incorporated by reference herein in its entirety.

What is claimed is:

1. A control method for controlling a robot having a force detector by at least one processor, comprising:
by the at least one processor,
bringing a first object and a second object into contact with each other with a first force by using the robot, and generating teaching data based on the contact, when teaching the robot, and
fitting the first object and the second object to each other with a second force greater than the first force, by using the robot, when causing the robot to perform an operation according to the teaching data,
wherein the teaching data is generated based on the contact on a plurality of relative positions of the first object and the second object, and
wherein the bringing the first object and the second object into contact is in a first direction in which the first object and the second object are brought close to each other from each relative position of the plurality of relative positions, and
wherein the plurality of relative positions are positions in a two-dimensional direction that intersects the first direction.

2. A controller which performs a fitting work between a first object and a second object that can be fitted to the first object, and controls a robot having a force detector, the controller comprising:
at least one processor,
wherein when teaching the robot, the at least one processor is configured to bring a first object and a second object into contact with each other with a first force by using the robot, and the at least one processor is configured to generate teaching data based on the contact,
wherein when causing the robot to perform a fitting operation according to the teaching data, the at least one processor is configured to cause the first object and the second object to be fitted to each other with a second force greater than the first force, by using the robot,
wherein the teaching data is generated based on the contact on a plurality of relative positions of the first object and the second object,
wherein the at least one processor is configured to perform the contact in a first direction in which the first object and the second object are brought close to each other from each relative position of the plurality of relative positions, and wherein the plurality of relative positions are positions in a two-dimensional direction that intersects the first direction.

3. The controller according to claim 2, wherein the plurality of relative positions are set at a first interval in the two-dimensional direction.

4. The controller according to claim 3, wherein the plurality of relative positions are set at a second interval narrower than the first interval in the two-dimensional direction, in a region including a relative position where a movement distance of the first object is a longest distance when the first object and the second object are brought into contact with each other with the first force by moving the first object along the first direction from each relative position of the plurality of relative positions.

5. The controller according to claim 2, wherein the at least one processor is configured to perform the contact between the first object and the second object at a plurality of rotation angles around one or more axial directions.

6. The controller according to claim 2, wherein the at least one processor is configured to bring the first object and the second object to move away after the contact at each relative position of the plurality of relative positions.

7. The controller according to claim 2, wherein the at least one processor is configured to select a relative position where a movement distance of the first object is a longest distance when the first object and the second object are brought into contact with each other with the first force by moving the first object along the first direction from each relative position of the plurality of relative positions, and the at least one processor is configured to set the selected relative position as a teaching point of the teaching data.

8. The controller according to claim 2, wherein the first object and the second object are electrical connectors that are not fitted to each other with the first force but are fitted to each other with the second force.

9. A robot system comprising:

the robot; and the controller according to claim 2 connected to the robot.

10. A robot system comprising:

the robot; and the controller according to claim 3 connected to the robot.

11. A robot system comprising:

the robot; and the controller according to claim 4 connected to the robot.

12. A robot system comprising:

the robot; and the controller according to claim 5 connected to the robot.

13. A robot system comprising:

the robot; and the controller according to claim 6 connected to the robot.

14. A robot system comprising:

the robot; and the controller according to claim 7 connected to the robot.

15. A robot system comprising:

the robot; and the controller according to claim 8 connected to the robot.

* * * * *